US012646874B2

(12) United States Patent
Genau et al.

(10) Patent No.: US 12,646,874 B2
(45) Date of Patent: Jun. 2, 2026

(54) PRINTED CIRCUIT BOARD ARRANGEMENT

(71) Applicant: HARTING ELECTRONICS GMBH, Espelkamp (DE)

(72) Inventors: Marc Genau, Lübbecke (DE); Rainer Bussmann, Bad Essen (DE)

(73) Assignee: HARTING ELECTRONICS GMBH, Espelkamp (DE)

( * ) Notice: Subject to any disclaimer, the term of this patent is extended or adjusted under 35 U.S.C. 154(b) by 273 days.

(21) Appl. No.: 18/291,161

(22) PCT Filed: Jul. 8, 2022

(86) PCT No.: PCT/DE2022/100490
§ 371 (c)(1),
(2) Date: Jan. 22, 2024

(87) PCT Pub. No.: WO2023/001330
PCT Pub. Date: Jan. 26, 2023

(65) Prior Publication Data

US 2024/0332837 A1 Oct. 3, 2024

(30) Foreign Application Priority Data

Jul. 23, 2021 (DE) ..................... 10 2021 119 087.8

(51) Int. Cl.
*H01R 12/71* (2011.01)
*H01R 12/72* (2011.01)
(Continued)

(52) U.S. Cl.
CPC ......... *H01R 12/716* (2013.01); *H01R 12/721* (2013.01); *H01R 13/506* (2013.01); *H01R 13/518* (2013.01)

(58) Field of Classification Search
CPC .. H01R 12/716; H01R 12/721; H01R 13/506; H01R 13/518
(Continued)

(56) References Cited

U.S. PATENT DOCUMENTS 3,812,381 A 5/1974 Guyton
8,690,586 B2 * 4/2014 Schneider ............. H01R 12/91 439/66
(Continued)

FOREIGN PATENT DOCUMENTS

CN 109479382 A 3/2019
CN 111758189 A 10/2020
(Continued)

OTHER PUBLICATIONS

International Preliminary Report on Patentability, dated Jan. 18, 2024, for International Patent Application No. PCT/DE2022/100490. (8 pages).
(Continued)

*Primary Examiner* — Gary F Paumen
(74) *Attorney, Agent, or Firm* — Seed Intellectual Property Law Group LLP

(57) ABSTRACT

A printed circuit board assembly is provided having a first printed circuit board with at least two contact openings, at least two printed circuit board contact elements, each of which has a plug end and a connection end, the plug end being plugged into the contact opening in the first printed circuit board, a second printed circuit board with at least two contact openings, wherein the connection ends of the printed circuit board contact elements are secured to a contact opening in the second printed circuit board, and a plastic housing which is mounted on the first printed circuit board and in which the printed circuit board contact elements are movably mounted.

10 Claims, 2 Drawing Sheets

(51) Int. Cl.
*H01R 13/506* (2006.01)
*H01R 13/518* (2006.01)

(58) Field of Classification Search
USPC ................................................ 439/79, 74, 75
See application file for complete search history.

(56) References Cited

U.S. PATENT DOCUMENTS

| | | | | |
|---|---|---|---|---|
| 9,039,433 | B2 * | 5/2015 | Barthelmes | H01R 24/542 439/248 |
| 9,219,325 | B2 * | 12/2015 | Endo | H01R 13/46 |
| 11,056,807 | B2 * | 7/2021 | Hoyack | H01R 12/58 |
| 11,316,290 | B2 * | 4/2022 | Kliever | H01R 12/523 |
| 11,901,654 | B2 * | 2/2024 | Hoyack | H01R 12/7082 |
| 2003/0232541 | A1 | 12/2003 | Meister | |
| 2009/0120668 | A1 | 5/2009 | Fjelstad et al. | |
| 2010/0081309 | A1 * | 4/2010 | Voli | H01R 13/6275 29/854 |
| 2011/0104911 | A1 | 5/2011 | Sypolt et al. | |
| 2012/0178313 | A1 | 7/2012 | Asano et al. | |
| 2014/0087592 | A1 | 3/2014 | Endo et al. | |
| 2015/0289375 | A1 | 10/2015 | Ozaki et al. | |
| 2015/0325963 | A1 * | 11/2015 | Chen | H01R 13/6596 439/573 |
| 2016/0353573 | A1 | 12/2016 | Chen et al. | |
| 2018/0301830 | A1 | 10/2018 | Hoyack et al. | |
| 2020/0329562 | A1 | 10/2020 | Hsieh et al. | |
| 2020/0395695 | A1 | 12/2020 | Benzin | |
| 2021/0203095 | A1 | 7/2021 | Kliever | |
| 2021/0289651 | A1 | 9/2021 | Klanke et al. | |
| 2022/0328988 | A1 | 10/2022 | Wang et al. | |

FOREIGN PATENT DOCUMENTS

| | | | |
|---|---|---|---|
| CN | 112954893 | A | 6/2021 |
| DE | 10206106 | A1 | 11/2002 |
| DE | 102017120357 | A1 | 3/2019 |
| DE | 102018105784 | A1 | 9/2019 |
| DE | 112012002122 | B4 | 11/2020 |
| DE | 102020211008 | A1 | 3/2021 |
| EP | 3399597 | A2 | 11/2018 |
| EP | 3794684 | A1 | 3/2021 |
| WO | WO 2020167603 | A1 | 8/2020 |
| WO | WO 2021013297 | A1 | 1/2021 |

OTHER PUBLICATIONS

European Patent Office, International Search Report and Written Opinion for International Application No. PCT/DE2022/100490, mailed Oct. 21, 2022, 14 pages (with English translation of International Search Report).

German Patent Office, Office Action for German application No. 10 2021 119 087.8 dated Mar. 11, 2022, 5 pages.

* cited by examiner

PRINTED CIRCUIT BOARD ARRANGEMENT

BACKGROUND

Technical Field

The present disclosure relates to a printed circuit board arrangement.

Such printed circuit board arrangements are often installed in housings of electrical appliances, control units, or similar systems.

Description of the Related Art

The abovementioned housings are subject to high vibrations in particular in an industrial context, as a result of which in particular the plug connections of the printed circuit boards implemented can be harmed and can fail.

The document EP 3 794 684 A1 shows a printed circuit board contact element, the plugging of which into the printed circuit board for contacting has a certain degree of play, as a result of which certain vibration loads can be compensated. Two printed circuit boards with a cable can be contacted with each other by such a contact element. Care should be taken here that the cable is routed suitably.

The document WO 2021/013297 A1 shows a printed circuit board contact element for contacting two printed circuit boards. The contact element is rigidly fastened on a first printed circuit board with the connection end. It penetrates a contact opening of a second printed circuit board with the other end. The second end is clamped in this contact opening by a special geometry. Vibration play is produced as a result. However, the electrical contact between the contact element and the contact opening becomes worn over time in the case of a continuous vibration load.

A search by the German Patent and Trademark Office has found the following prior art in the priority application for the present application:

US 2011/0104911 A1, DE 10 2018 105 784 A1, DE 11 2012 002 122 B4, EP 3 794 684 A1, and WO 2021/013297 A1.

BRIEF SUMMARY

Embodiments of the disclosure provide for a reliable printed circuit board arrangement.

The printed circuit board arrangement according to an embodiment described herein includes a first printed circuit board. The first printed circuit board includes at least two contact openings for printed circuit board contact elements. The printed circuit board arrangement includes at least two such printed circuit board contact elements. The printed circuit board contact elements have in each case a plug-in end and a connection end, wherein the plug-in end is plugged into the contact opening of the first printed circuit board.

The printed circuit board arrangement includes a second printed circuit board. The second printed circuit board in turn has at least two contact openings. The contact openings of the first and second printed circuit board may be configured in the same way geometrically. The contact openings may be in each case formed from an essentially circular through-opening with an edge region which includes electrically conductive material or is made therefrom. The edge region can in turn be connected electrically conductively to a trace of the respective printed circuit board.

The plug-in end of the printed circuit board plug connector advantageously has axial slots. As a result, a certain clamping effect of the contact end of the printed circuit board contact element in the contact opening is produced.

The connection end of the printed circuit board contact elements is fastened in each case at a contact opening of the second printed circuit board. A screw fastening or screw connection may be selected for this purpose.

The printed circuit board arrangement furthermore includes a plastic housing. The plastic housing may be assembled on the first printed circuit board or fastened thereon. The printed circuit board contact elements are mounted displaceably in the plastic housing.

The first and second printed circuit board may be arranged parallel to each other. Such an arrangement can be found, for example, in electrical appliances, wherein the first printed circuit board is arranged on a first appliance inner wall and the second printed circuit board is arranged on a second housing inner wall situated opposite. The printed circuit boards can then be contacted from outside via a plug connector via corresponding appliance sockets on the appliance walls. Electrical currents and/or data can consequently be transmitted to the appliance as a result.

The direction of displacement of the printed circuit board contact elements may be oriented in the plastic housing parallel to the normal vector of the printed circuit board plane of the printed circuit boards. As a result, the second printed circuit board can, as a whole, be displaced relative to the first printed circuit board and parallel thereto. If the printed circuit board arrangement as a whole is considered, the first and the second printed circuit board are arranged so that they can move relative to each other by the technical means explained above. The second printed circuit board thus moves in parallel with the first printed circuit board or away from the latter.

The relative ability of the printed circuit boards to move relative to each other is also referred to as printed circuit board play. As a result, a vibrational load of technical appliances with such a printed circuit board arrangement is reduced and the durability of such technical appliances increased considerably. Structural tolerances can also be compensated by the printed circuit board play. Cooperation between manufacturers of such appliances and suppliers is facilitated as a result.

The printed circuit board contact elements may be mounted in the plastic housing so that they cannot twist and are also retained therein so that they cannot be detached. As a result, they can be connected through the printed circuit board by screws without having to manually prevent the contact element from twisting again.

In one embodiment of the disclosure, laterally protruding lugs may be integrally formed on the plastic housing. The first printed circuit board has screw openings which correlate therewith. The plastic housing can be screwed to the first printed circuit board via the screw openings. The plastic housing moreover has prongs which can be plugged into openings provided therefor of the first printed circuit board. Stable prefixing of the plastic housing on the printed circuit board for subsequent screwing may be produced as a result. The prongs in each case may have a cross-shaped cross-section.

BRIEF DESCRIPTION OF THE SEVERAL VIEWS OF THE DRAWINGS

Embodiments of the disclosure are illustrated in the drawings and are explained in more detail below.

The figures may contain in some cases simplified, schematic illustrations. Identical reference signs are sometimes used for the same but possibly non-identical elements. Different views of the same elements might be at different scales.

DETAILED DESCRIPTION

Figure 1:
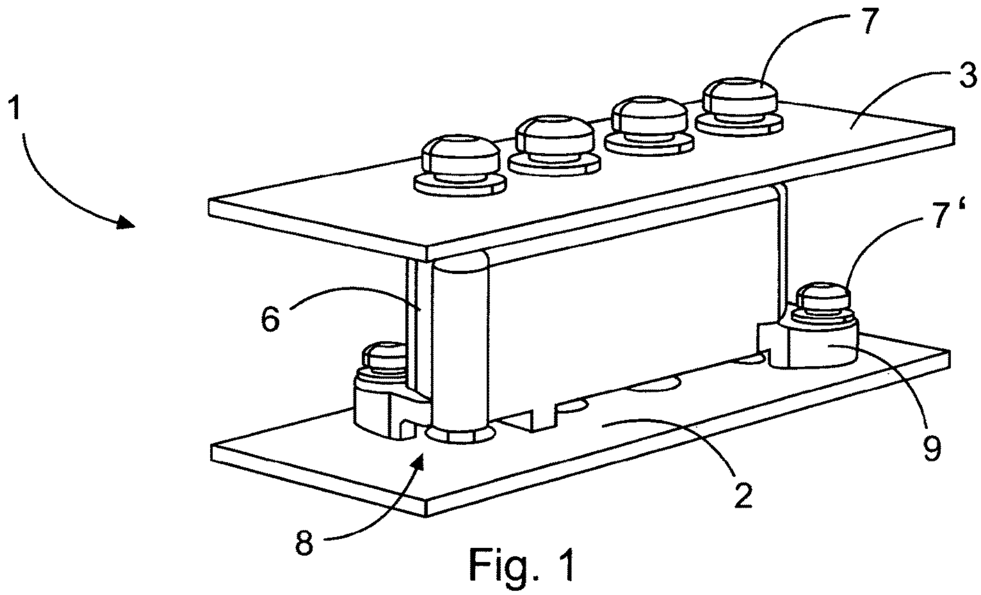
FIG. 1 shows a perspective view of a printed circuit board arrangement.

FIG. 1 shows a perspective illustration of a printed circuit board arrangement 1. A corresponding exploded view of the printed circuit board arrangement 1 is shown in a side view in FIG. 2.

The printed circuit board arrangement has a first printed circuit board 2 and a second printed circuit board 3 arranged parallel thereto. A plastic housing 6 is assembled on and fastened so that it cannot be detached to the first printed circuit board. For this purpose, the plastic housing 6 has prongs 10 with a cross-shaped cross-section which are plugged into corresponding openings of the first printed circuit board 2. Lugs, into which screws 7' are inserted and screwed into screw openings provided therefor of the first printed circuit board 2, are integrally formed on the sides of the plastic housing 6.

Figure 5:
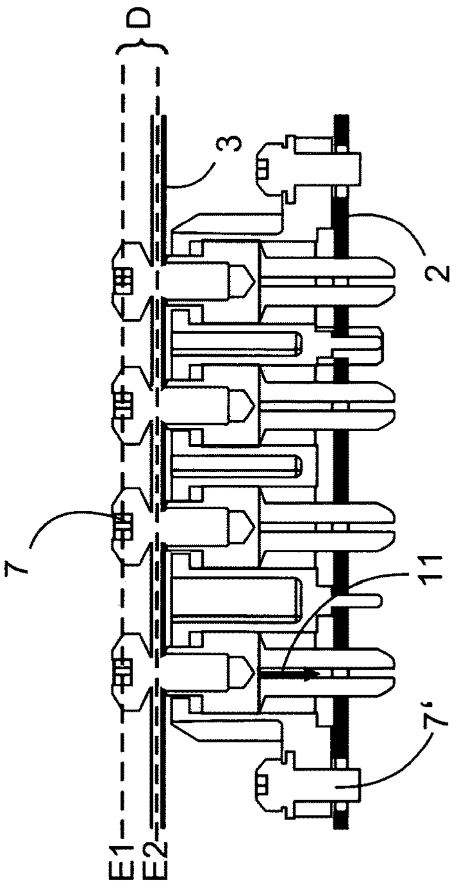
FIG. 5 shows a side view in section of the printed circuit board arrangement in a second play situation.
Figure 4:
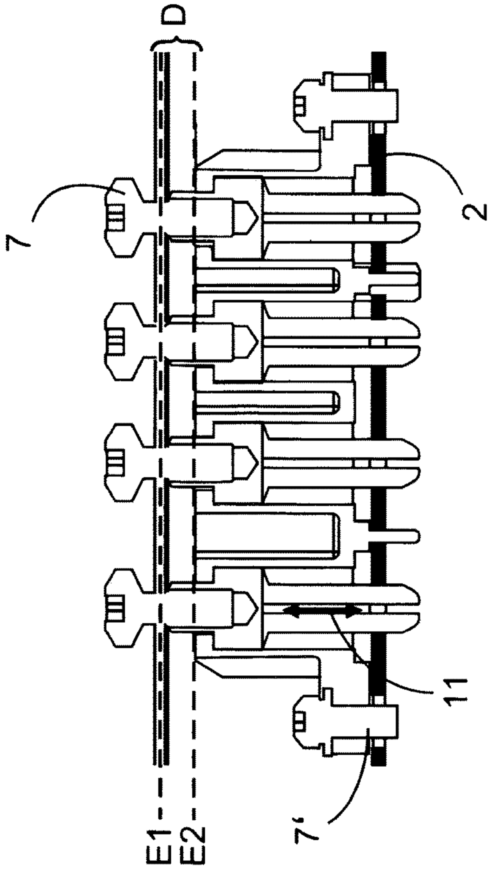
FIG. 4 shows a side view in section of the printed circuit board arrangement in a first play situation.

The printed circuit board contact elements 4 are mounted in the plastic housing 6 in such a way that they have a direction of displacement which is oriented in the direction of the double-headed arrow 11 (see FIGS. 4 and 5). The printed circuit board contact elements 4 cannot, however, rotate radially along this axis of movement.

Figure 2:
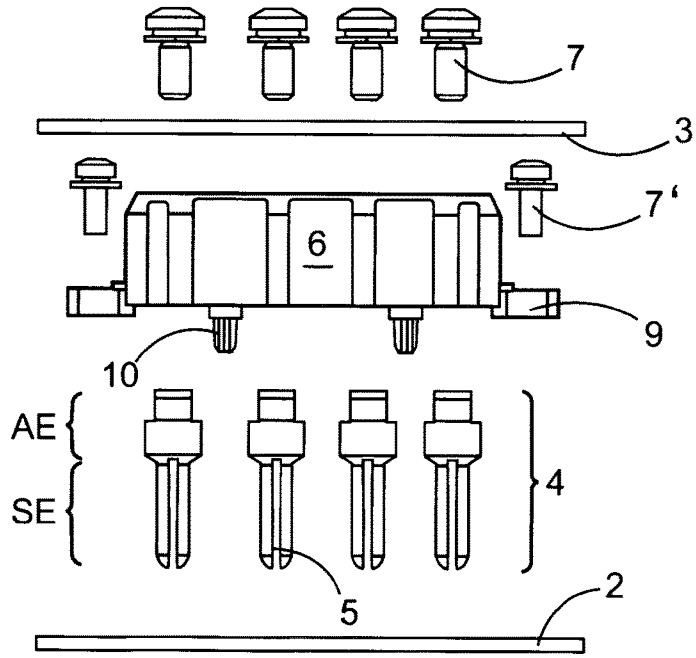
FIG. 2 shows an exploded view of the printed circuit board arrangement.
Figure 3:
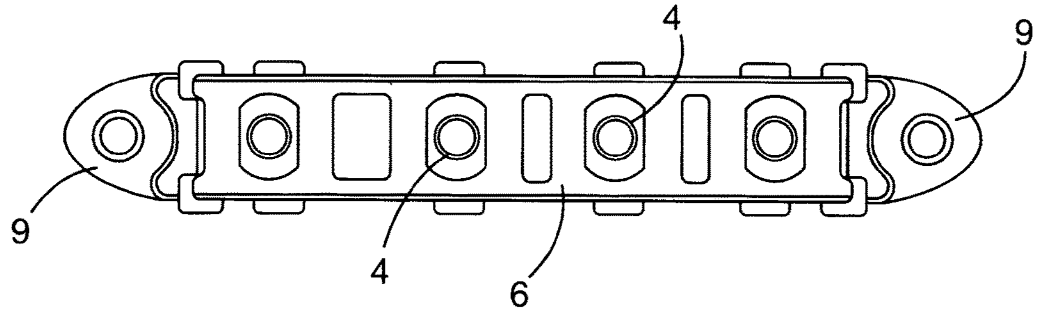
FIG. 3 shows a plan view of a plastic housing of the printed circuit board arrangement.

As can be seen in FIG. 2, the printed circuit board contact elements 4 have in each case a plug-in end SE and a connection end AE. The printed circuit board contact elements 4 are plugged into a contact opening 8 of the first printed circuit board 2 with the plug-in end SE. The printed circuit board contact elements 4 are screwed with the connection end at a corresponding contact opening (not shown for illustrative reasons) of the second printed circuit board 3 with the aid of screws 7.

The most spaced-apart position between the first printed circuit board 2 and the second printed circuit board 3 is illustrated in FIG. 4. In contrast, FIG. 5 shows the closest position between the printed circuit boards 2, 3. The different position planes E1, E2 of the second printed circuit board 3 are indicated here. The height difference of these planes is labeled in the Figures with a capital "D." The height difference D can also be referred to as play or freedom to move.

Even though various aspects or features of embodiments of the disclosure are each shown in combination in the Figures, it is apparent to a person skilled in the art—unless otherwise indicated—that the combinations illustrated and discussed are not the only possible ones. In particular, corresponding units or feature combinations from different embodiments can be interchanged with each other. In other words, aspects of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A printed circuit board arrangement, comprising:
- a first printed circuit board with at least two contact openings;
- at least two printed circuit board contact elements, the printed circuit board contact elements each having a plug-in end and a connection end, wherein the plug-in end is plugged into a respective one of the contact openings of the first printed circuit board;
- a second printed circuit board with at least two contact openings, wherein each connection end of the printed circuit board contact elements is screwed on a respective one of the contact openings of the second printed circuit board; and
- a plastic housing assembled on the first printed circuit board, wherein the printed circuit board contact elements are displaceably mounted in the plastic housing.

2. The printed circuit board arrangement as claimed in claim 1, wherein the first and the second printed circuit boards are arranged parallel to each other.

3. The printed circuit board arrangement as claimed in claim 1, wherein a direction of displacement of the printed circuit board contact elements in the plastic housing is oriented parallel to a normal vector of the printed circuit board plane of the printed circuit boards.

4. The printed circuit board arrangement as claimed in claim 1, wherein each contact opening of the first printed circuit board is formed from an essentially circular through-opening with an edge region, wherein the edge region comprises electrically conductive material or is made therefrom.

5. The printed circuit board arrangement as claimed in claim 1, wherein the printed circuit board contact elements are mounted in the plastic housing so that the printed circuit board contact elements cannot twist.

6. The printed circuit board arrangement as claimed in claim 1, wherein laterally protruding fastening lugs are integrally formed on the plastic housing and the first printed circuit board has screw openings correlating therewith such that the plastic housing can be screwed rigidly on the first printed circuit board.

7. The printed circuit board arrangement as claimed in claim 1, wherein the plastic housing has prongs which can be plugged into openings provided therefor of the first printed circuit board.

8. The printed circuit board arrangement as claimed in claim 7, wherein the prongs in each case have a cross-shaped cross-section.

9. The printed circuit board arrangement as claimed in claim 1, wherein the plug-in end of each printed circuit board plug connector has at least two axial slots.

10. The printed circuit board arrangement as claimed in claim 1, wherein the second printed circuit board is displaceable relative to the first printed circuit board and parallel thereto.

* * * * *